United States Patent [19]

Barri

[11] Patent Number: 4,661,737
[45] Date of Patent: Apr. 28, 1987

[54] ELECTRICAL MACHINES WITH MULTIPLE AXES OF ROTATION

[75] Inventor: Mohamed M. Barri, Aleppo, Syria

[73] Assignee: The Curators of the University of Missouri, Columbia, Mo.

[21] Appl. No.: 767,920

[22] Filed: Aug. 21, 1985

[51] Int. Cl.4 .......................... H02K 1/06; H02K 5/04
[52] U.S. Cl. .................................. 310/166; 73/517 R; 74/5 R; 244/166; 310/261
[58] Field of Search ...................... 74/5 R, 5.6 D, 572; 73/517; 244/158, 164, 166, 176; 310/166, 208, 261; 318/115, 766

[56] References Cited

U.S. PATENT DOCUMENTS

| | | | |
|---|---|---|---|
| 2,669,126 | 2/1954 | Simmons et al. | 74/5.6 |
| 3,178,600 | 4/1965 | Bers | 310/166 |
| 3,260,475 | 7/1966 | Ormsby | 244/1 |
| 3,732,445 | 5/1973 | Laing | 310/90 |
| 3,741,690 | 6/1973 | Laing | 417/420 |
| 3,783,359 | 1/1974 | Malkiel | 318/254 |
| 4,051,401 | 9/1977 | Hayward | 310/216 |

OTHER PUBLICATIONS

*A Course in Electrical Engineering*, vol. II, by C. L. Dawes, 1947, pp. 305–312 and 423–425.
"Development and Design of Spherical Induction Motors", by Prof. F. C. Williams et al., *The Institution of Electrical Engrs.*, Paper No. 3036U, 1959, pp. 471–484.
"Magnetic Field, Parameters and Characteristics of Composite Motion Electric Motor", by G. Kaminski et al., *International Conf. on Elec. Machines*, 1982, Budapest, pp. 335–338.
"Elektryczny Silnik o Ruchu Zlozonym z Wirnikiem Kulistym", by M. Kant, *Przeglad Elektrotechniczny*, R. LVII (undated) pp. 278–280.
"Synchronizing (Selsyn) Devices", Sec. 11–11, undated, pp. 399–408.
"Operating Principle of the Induction Machine", undated, pp. 33–35.
"Servomotors", Chapter 16, undated, pp. 327–329.
"Magnetic Field of an Electric Motor of Three Degrees of Freedom", by J. Purczynski, *Archiwum Elektrotechniki*, Tom XXIII, z. 2., 1974, pp. 455–467.
"Electromagnetic Process Asynchron Spheric Polem Rotor", 1976, pp. 1231–1239.
Russian publication, pp. 67–70, 154–157.
"Momenty . . . ", B. Lebedev et al., pp. 85–88.
"Niektore Problemy Numerycznej Analizy Rozkladu Pola Elektromagnetyczenego w Silniku Elektrycznum o Ruchu Zlozonym", by M. Stabrowski et al., *Rozprawy Elektrotechniczne*, 1980.26.z.2, pp. 307–320.
*An Introduction to Electrical Machines and Transformers* by G. McPherson, 1981, p. 312.
*Electrical Machinery* by A. E. Fitzgerald et al., 1961, pp. 316–320.

*Primary Examiner*—Patrick R. Salce
*Assistant Examiner*—D. L. Rebsch
*Attorney, Agent, or Firm*—Senniger, Powers, Leavitt and Roedel

[57] ABSTRACT

Electrical machine including a base member, a rotor and a stator. The base member has a first magnetically permeable body with a first winding arrangement. The rotor has a second magnetically permeable body and is rotatable relative to the base member around first and second axes. The stator is adjacent to the base member, surrounds the rotor and has a stator core and second and third winding arrangements. The stator core is wound with the second winding arrangement held inward near the rotor, and wound with the third winding arrangement exterior to the stator core. The second winding arrangement is energizable to rotate the rotor around the first axis, and the first and third winding arrangements are jointly energizable to rotate the rotor around the second axis. Other electrical machines are also described.

28 Claims, 12 Drawing Figures

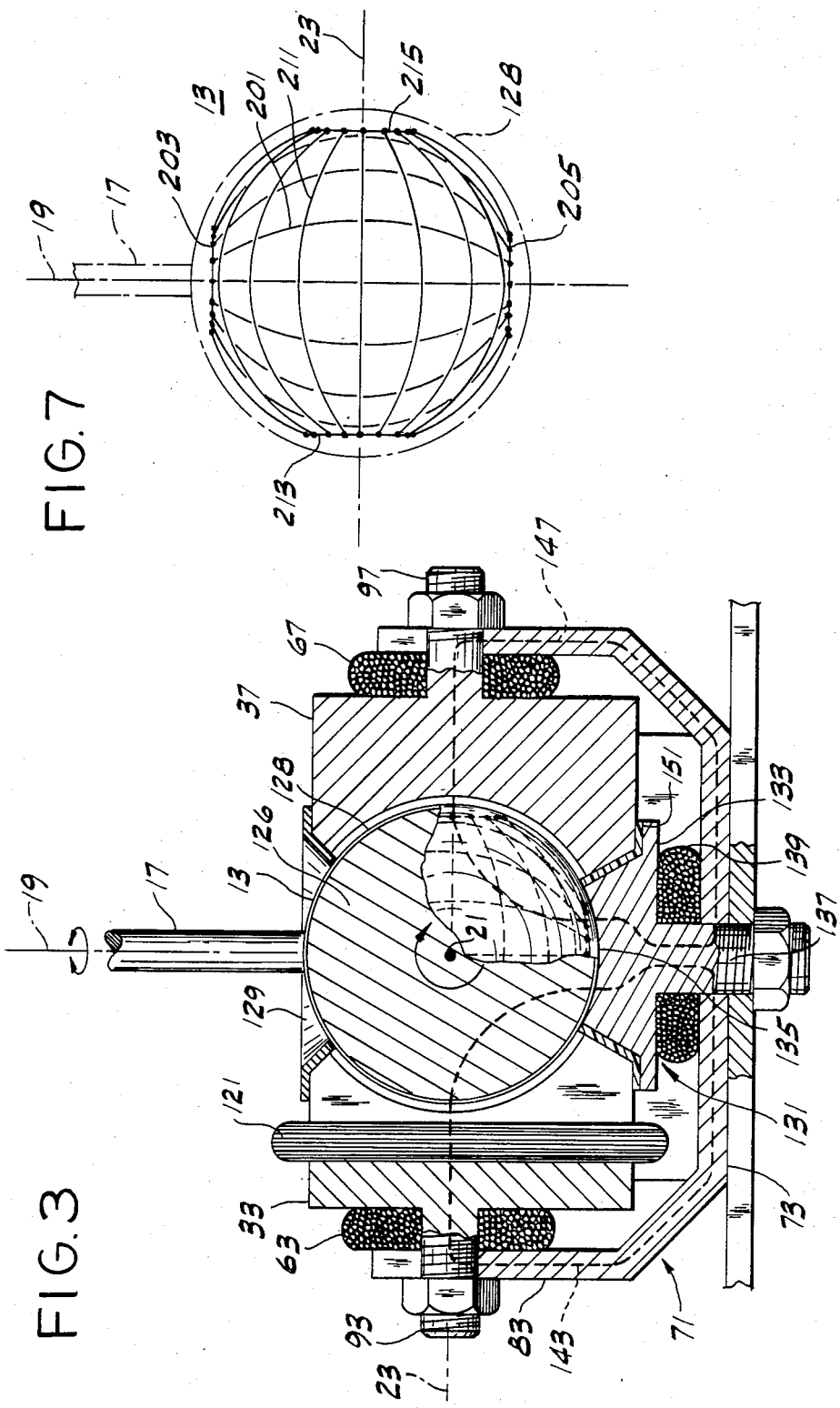

TIME

ELECTRICAL MACHINES WITH MULTIPLE AXES OF ROTATION

BACKGROUND OF THE INVENTION

The present invention relates to electrical machines. More specifically, the present invention relates to electrical machines such as motors, generators and servomechanisms having a rotor which is rotatable around more than one axis.

In the prior art, Bers U.S. Pat. No. 3,178,600 shows a structure having continuous helical coils with turns wound on concentric spherical members of high magnetic permeability. Rotation is permitted around just one axis.

Ormsby U.S. Pat. No. 3,260,475 shows a space vehicle directing apparatus with a hollow stainless steel rotor ball suspended in the vehicle by high electric fields. Magnetic fields are applied to induce a current in the rotor ball to magnetically effect a torque on it. An equal and opposite reaction torque turns the vehicle in space. Six substantially semicircular stator coil windings with wires interwound in a core of magnetic material are fixed to a housing and placed about the rotor ball in three mutually perpendicular planes.

F.C. Williams et al. "Development and Design of Spherical Induction Motors," Inst. Electrical Engineers, pp. 471–484, December 1959, describes motors with two or four stator blocks wound with a polyphase winding to produce a field travelling across a block. The inside surface of the block is part of a sphere which is concentric with the spherical surface of a rotor which can carry current in any surface direction. By rotating the stator block(s) the speed of the rotor, which turns around only one axis, can be varied.

G. Kaminski et al. "Magnetic Field, Parameters and Characteristics of Composite Motion Electric Motor" International Conference on Electric Machines, Budapest, 1982, pp. 335–338 shows spherical motors said to have two or three degrees of freedom. There is a hollow iron ball armature with a smooth surface of copper and chrome. One magnetic circuit of an "inductor" (separated from the ball by an air gap) is said to have two groups of slots in which are located two windings, which produce components of magnetic field perpendicular to each other.

SUMMARY OF THE INVENTION

Among the objects of the present invention are to provide improved electrical machines having a rotor that is rotatable relative to more than one axis and which have improved constructions with economic or performance advantages; to provide improved electrical machines of the foregoing types which are reliable and versatile; and to provide improved electrical machines of the foregoing types which can be used in one or more of a variety of fields such as electric control systems, servomechanisms, robotics, navigation, prosthetics or other fields.

Other objects and features will be in part apparent and in part pointed out hereinafter.

Generally, and in one form of the invention, an electrical machine includes a base member, a rotor and a stator. The base member has a first magnetically permeable body with a first winding arrangement. The rotor has a second magnetically permeable body and is rotatable relative to the base member around first and second axes. The stator is adjacent to the base member, surrounds the rotor and has a stator core and second and third winding arrangements. The stator core is wound with the second winding arrangement held inward near the rotor, and wound with the third winding arrangement exterior to the stator core. The second winding arrangement is energizable to rotate the rotor around the first axis, and the first and third winding arrangements are jointly energizable to rotate the rotor around the second axis.

In general, and in another form of the invention, an electrical machine includes a base member, a rotor and a stator. The base member has a first magnetically permeable body with a first winding arrangement. The rotor has a second magnetically permeable body. The stator is adjacent to the base member, surrounds the rotor and has separated magnetically permeable blocks positioned around an axis through the base member. The stator further has second and third winding arrangements exterior to and respectively associated with at least two of the blocks, and means exterior to the stator blocks for completing magnetic circuits through the first winding arrangement to the rotor and through the second and third winding arrangements. The first and second winding arrangements are jointly energizable to rotate the rotor around a second axis perpendicular to the first-named axis. The first and third winding arrangements are jointly energizable to rotate the rotor around a third axis perpendicular to both the first-named axis and the second axis.

BRIEF DESCRIPTION OF THE DRAWINGS

FIG. 3 is a cross-sectional view in elevation of the electrical machine of FIG. 2;

FIG. 7 is an elevation view showing the construction of a rotor for the electrical machine of FIG. 1.

Corresponding reference characters refer to corresponding parts throughout the several views of the drawings.

DETAILED DESCRIPTION OF PREFERRED EMBODIMENTS

Figure 1:
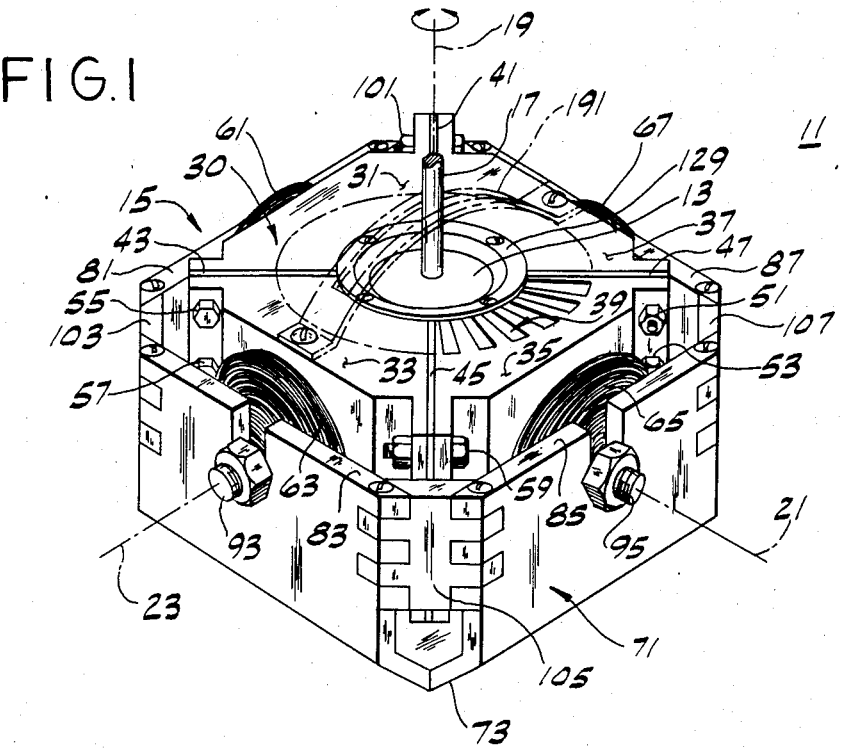
FIG. 1 is a perspective view of an embodiment, by way of example only, of an electrical machine of the invention.

In FIG. 1 an electrical machine 11 in one preferred embodiment of the invention has a spherical magnetically permeable rotor 13. A stator 15 surrounds rotor 13. Rotor 13 has a shaft 17 and is rotatable around a vertical axis 19 of the motor and can rotate or turn away from axis 19 around mutually perpendicular horizontal axis 21 and 23 as well. Stator 15 has a stator core 30 comprising four separated magnetically permeable blocks 31, 33, 35, and 37 positioned around vertical axis 19. Each of the stator blocks 31, 33, 35 and 37 has six slots, such as slots 39 of block 35. Blocks 31, 33, 35, and 37 are separated by dividers or barriers 41, 43, 45, and 47 for reducing magnetic coupling between adjacent stator blocks and increasing the magnetic coupling between each stator block and rotor 13. Bolts or rivets such as 51, 53, 55, 57, and 59 are used to fasten the stator blocks together.

The stator 15 also includes circular concentrated coils 61, 63, 65, and 67 exterior to and associated with the stator blocks 31, 33, 35, and 37 respectively. Each coil 61, 63, 65, and 67 constitutes a respective individual winding arrangement of uncomplicated type, although other more complicated winding arrangements can be substituted for them in more complex embodiments of the invention. An assembly 71 for completing the magnetic circuit of the machine 11 includes a magnetically permeable bottom cover 73 with four sides 81, 83, 85 and 87 extending up exterior to coils 61, 63, 65 and 67 respectively. Four magnetically permeable shanks 91, 93, 95 and 97 provide respective magnetic paths from each stator block 31, 33, 35 and 37 through each of the coils 61, 63, 65 and 67 respectively to sides 83, 85, 87 and 89 of cover 71. Corner plates 101, 103, 105, and 107 are respectively bolted between sides 81, 83, 85 and 87.

Figure 2:
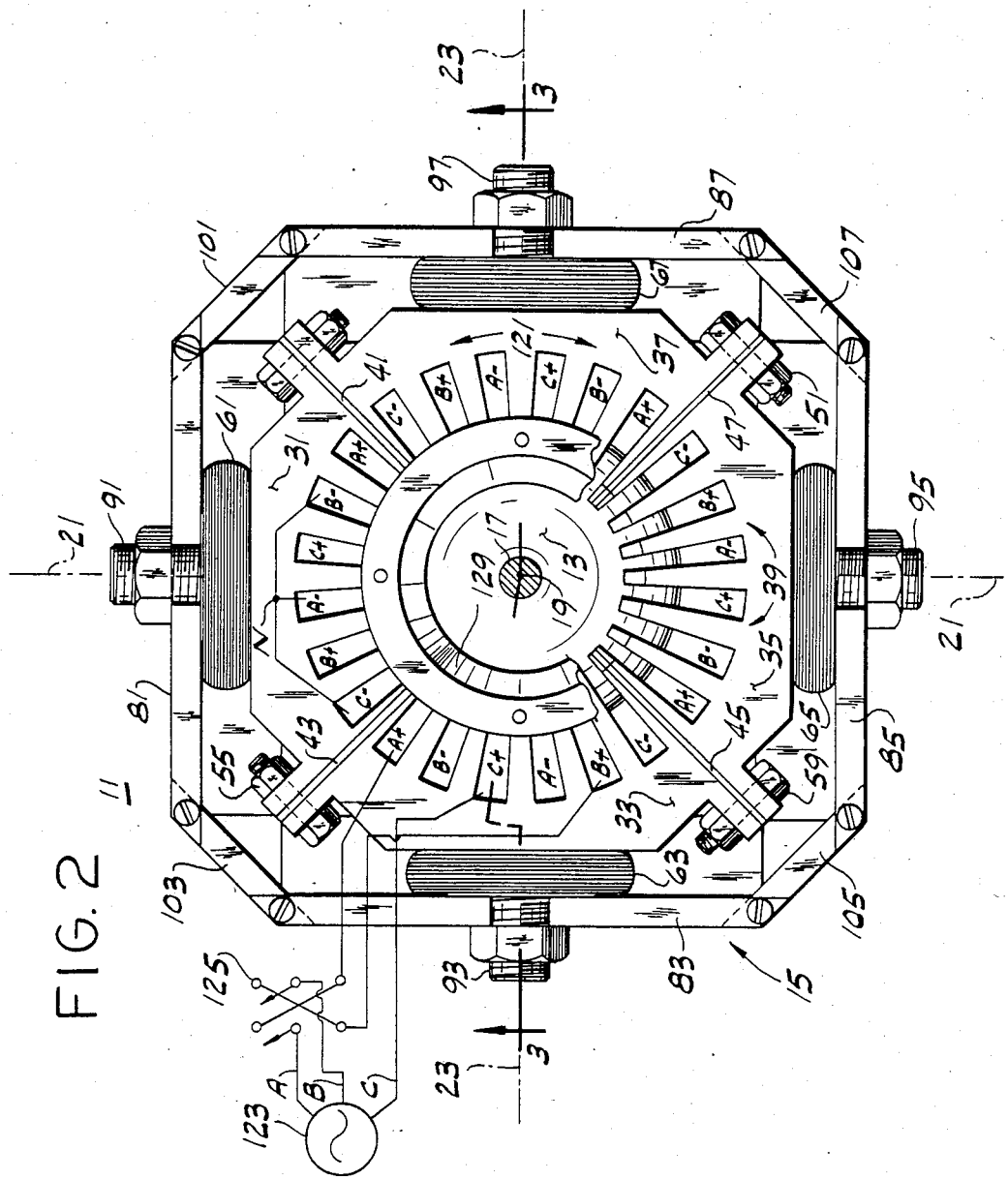
FIG. 2 is a plan view of the electrical machine of FIG. 1 with a schematic diagram of a circuit for an inner winding arrangement for the electrical machine.

The slots (such as slots 39) of all the stator blocks 31, 33, 35 and 37 of FIG. 1 hold an inner winding arrangement 121 around the entire circumference of rotor 13, as shown in greater detail in FIG. 2. Winding arrangement 121 is electrically energizable by a three-phase electrical power source 123 having lines A, B and C. A double-pole double-throw (DPDT) center-off reversing switch 125 reverses the connections of the A and B phases to the winding arrangement 121 to rotate the rotor 13 clockwise around the first axis 19 or in reverse, counter-clockwise around axis 19. In the center-off position of switch 125 the lines A and B are disconnected from winding arrangement 121, which is thus deenergized.

Each stator block 31, 33, 35 and 37 is supplied with a corresponding set of three coils having conductors respectively pressed into three pairs of slots A+, A−; B+, B−; and C+, C−. In counterclockwise order the slots are designated A+, B−, C+, A−, B+, C− in each stator block. For example, in a given coil, current passing into the A+ slot is directed into the plane of the paper in FIG. 2 and then comes out of the plane of the paper in the A− slot. The lines from power source 123 and reversing switch 125 lead to the A+, B+, and C+ slots of stator block 33. Conductor ends from the A−, B−, and C− slots of stator blocks 33, 35, and 37 are respectively series-connected (connections not shown for brevity) to conductors of the next-following coils directed to the A+, B+, and C+ slots of stator blocks 35, 37, and 31 respectively. The conductor ends from the A−, B−, and C− slots of stator block 31 are connected together to form a floating neutral N. Thus, the inner winding arrangement 121 as a whole is a wye winding held inward near the rotor 13 which winding produces a magnetic field between rotor 13 and stator blocks 31, 33, 35, and 37. The magnetic field revolves around axis 19, causing rotor 13 to spin by an induction principle.

In FIG. 3 rotor 13 is shown surrounded by stator blocks such as blocks 31 and 37. There are twelve coils (4 blocks times 3 coils per block) of inner winding 121. Conductors of one of the twelve coils of inner winding 121 are shown as a vertical column in one of the slots of block 33. Rotor 13 is partially cut away to show a magnetically permeable interior body 126 and a smooth, hard outer coating 128. A top collar 129 acting as a low-friction bearing arrangement centers rotor 13 in the space between the stator blocks.

Rotor 13 is supported on a base member 131 which has a magnetically permeable pedestal body 133. Pedestal 133 has a friction-reducing material 135 such as Teflon (trademark) or hard plastic overlying it and forming a curved concave surface accommodating the spherical surface of rotor 13. Pedestal 133 continues downward as a magnetically permeable shank 137. A circular concentrated coil 139 is positioned around shank 137 between the pedestal 133 and the bottom 73 of cover 71. Pedestal 133 is thus seen to be interposed between coil 139 and rotor 13. Circular coil 139 is regarded as part of the base member 131 and constitutes an advantageously uncomplicated first winding arrangement for it.

Figure 4:
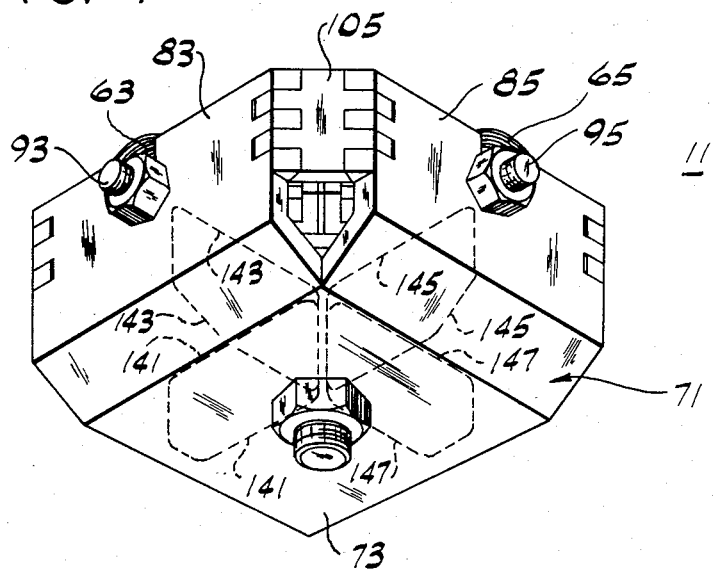
FIG. 4 is a perspective view from below, of the electrical machine of FIG. 1, showing four magnetic circuits therein.

In FIG. 4 cover 71 completes four magnetic circuits 141, 143, 145, and 147 to rotor 13 (see also FIG. 3) and through coil 139 through coils 91, 93, 95 and 97 respectively. The coil 139 and the additional coils 61, 63, 65 and 67 are consequently energizable to rotate the rotor 13 around the axes 21 and 23. FIG. 3 shows two of the magnetic circuits 143 and 147 in greater detail. Magnetic circuit 143 passes through coil 139 to rotor 13, through coil 63 and back to coil 139 through cover 71. Magnetic circuit 147 passes through coil 139 to rotor 13, through coil 67 and also back to coil 139 through cover 71. A high reluctance barrier 151 of low permeability material separates the high permeability pedestal body 133 from stator blocks 31, 33, 35 and 37. The stator core 30 with its stator blocks 31, 33, 35 and 37 and barrier 151 is thus regarded as adjacent to base member 131. Barrier 151 thereby prevents magnetic flux in magnetic circuits 141, 143, 145 and 147 from completely bypassing rotor 13 directly from the stator blocks to pedestal 133.

Rotor 13 rotates around axis 21 (axis 21 is into the plane of the paper in FIG. 3) when coil 139 is energized with alternating electric current (AC) which is in quadrature (90° out of phase) with an AC electric current supplied to coil 63 and/or coil 67. For instance, when the current in coil 139 is a cosine wave at a frequency (e.g. 60 Hertz) and the current in both of the coils 63 and 67 is a sine wave at the same frequency, a complex magnetic field distribution with a moving distribution of north (N) and south (S) poles is set up on the surface of rotor 13. As a result, a torque is exerted on rotor 13, making it turn by the induction motor principle previously referred to.

Figure 5:
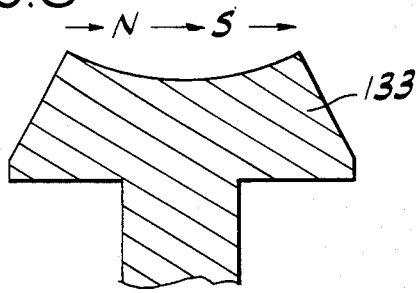
FIG. 5 is cross-section of a part of a base member of the electrical machine, which part is also shown in FIG. 3.

FIG. 5 diagrammatically illustrates a moving field distribution which is believed to occur with peaks represented by N and S poles moving over pedestal 133. Magnetic flux density as a function of position across the surface of pedestal 133 is described by four graphs of FIGS. 5A, 5B, 5C and 5D corresponding to four respective instants in one alternating current cycle. At a first time in the cycle (FIG. 5A) electric current is instantaneously flowing in both coils 139 and 63. This distorts what would otherwise be a symmetric distribution of magnetic flux density over pedestal 133 and produces a field distribution with a peak N at left and a valley S at right. Subsequently in the cycle (FIG. 5B) electric current is instantaneously flowing only in coil 139 and the magnetic field is symmetrical with peak N moving to the center.

Figure 5A:
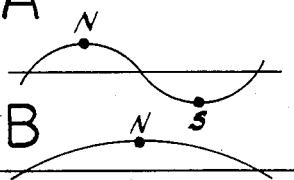
FIGS. 5A, 5B, 5C and 5D are a sequence of diagrams of a magnetic field distribution moving across the base member of FIG. 5. The sequence of diagrams is vertically aligned with FIG. 5. Each diagram has as abscissa the position across the base member, and flux density as the ordinate. The sequence from FIG. 5A to FIG. 5D suggests the field distribution as time advances through one alternating current cycle.
Figure 5B:
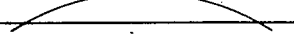
Figure 5C:
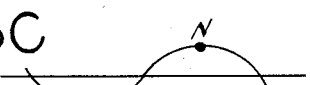
Figure 5D:

Still later, the direction of the instantaneous electric currents has changed to distort the field distribution of FIG. 5C in a manner reversed from that of FIG. 5A so that peak N moves to the right and a valley S appears at left. Still later (FIG. 5D) the direction of the instantaneous electric current in coil 139 has reversed and the instantaneous current in coils 63 and 67 is zero. Now the field distribution is reversed in direction but symmetrical again, with valley S moving to the center. The cycle repeats itself beginning again as shown in FIG. 5A with the valley S moving on to the right and peak N again appearing at left. It is apparent that there is a motion of N and S magnetic poles to the right in this simplified example, and this motion of magnetic poles causes a torque around axis 21 in FIGS. 1 and 3 to rotate rotor 13 in one direction. Rotor 13 is caused to rotate in the opposite direction by interchanging the currents so that a sine wave current flows in coil 139 and a cosine wave current at the same frequency flows in coil 63 (and 67).

Rotor 13 is rotated around axis 23 by exciting coil 61 and/or coil 65 with a current which is in quadrature with a current made to flow in coil 139. Then the magnetic field distribution is as shown in FIGS. 5, 5A, 5B, 5C, and 5D except into the plane of the paper in FIG. 3, causing the rotation around axis 23.

Figure 6:
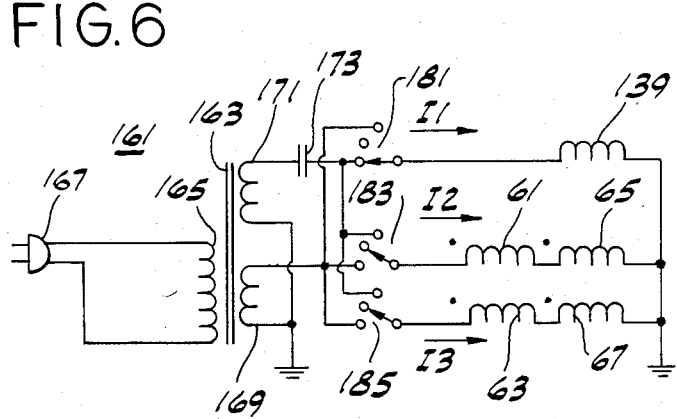
FIG. 6 is a schematic diagram of a circuit for selectively energizing a coil in the base member and also exterior coils in the electrical machine of FIG. 1.

FIG. 6 shows a circuit 161 for selectively energizing the coils 61, 63, 65, 67, and 139 with currents I1, I2 and I3 of which at least the current in one of the coils (e.g. 139) is displaced in phase from the other currents. A transformer 163 has its primary 165 connected to a plug 167 for connection to single phase AC power. A first secondary winding 169 supplies an AC current when connected to one or more of the coils of electrical machine 11. Another secondary winding 171 is connected in series with a capacitor 173 and supplies another AC current which is displaced in phase relative to the current supplied by secondary 169.

In FIG. 6 both secondary windings 169 and 171 have one lead connected to a common, and coils 139, 65, and 67 have one lead each connected to the common. Three independent single-pole double-throw center-off switches 181, 183, and 185 are used to selectively determine the AC currents to be supplied to the coils. The coil 139 is connected to the arm of switch 181, and the AC current through coil 139 is designated I1. Coil 61 is connected between the arm of switch 183 and coil 65. Coils 61 and 65, which are associated with opposing stator blocks 31 and 35, are connected series-aiding, and a current I2 is passed through them. Coil 63 is connected between the arm of switch 185 and coil 67. Coils 63 and 67, which are associated with opposing stator blocks 33 and 37, are connected series-aiding, and a current I3 is passed through them. By "series-aiding" is meant that if no other coils are energized, the AC current sets up magnetic fields having the same direction as seen in FIG. 3 (magnetic field to the right through coil 67 when magnetic field is to the right through coil 63 in FIG. 3).

The arm of each switch 181, 183, and 185 can independently have any of three positions, a first position connecting to secondary 169, a second position having no connection, and a third position connecting to phase-altering capacitor 173. In this way, coil 139 can be driven in quadrature with respect to either coil pair 61, 65 or pair 63, 67 by connecting switch 181 arm to capacitor 173 and switch 183 or 185 arm respectively to secondary 169. In other words, if coil 139 is jointly energized with one or both coils on opposing stator blocks, rotation around axis 23 or 21 occurs depending on which pair of opposed stator blocks the energized coils are located on.

If coil 139 is disconnected and coil pair 61, 65 is driven in quadrature with respect to pair 63, 67, rotation around axis 19 occurs. The switch settings for the latter operation are: switch 181—no connection, switch 183—connect to secondary 169, switch 185—connect to capacitor 173. Since inner winding arrangement 121 is also provided to cause rotation around the axis 19, it is apparent that the various coils can be used with considerable versatility. In some embodiments, inner winding arrangement 121 is omitted and in other embodiments it is retained as applications demand.

Because coil 139 is energizable in quadrature with at least one of the other coils 63 or 67 there are thus at least two winding arrangements that are jointly energizable to rotate the rotor around a second axis (the axis 21) in addition to axis 19. Moreover, because coil 139 is alternatively or even simultaneously energizable in quadrature with at least one of the other coils 61 or 65 there are thus winding arrangements that are jointly energizable to rotate the rotor around a third axis (the axis 23) in addition to axes 19 and 21. In other words, if axis 19 be regarded as a first axis and coil 139 is jointly energized first with a coil on one stator block (e.g., 33), rotation occurs around a second axis. Then if coil 139 is jointly energized with a coil on an adjacent stator block (e.g., 35), the rotation occurs around a third axis.

In an alternative embodiment, inner winding arrangement 121 is provided in the slots of the stator core 30, but coils 61 and 65 are omitted. In that embodiment an optional slotted arcuate shaft guide 191 is attached to stator blocks 33 and 37 to constrain the rotor from turning around axis 23 but leaving it rotatable around axes 19 and 21.

In FIG. 7 rotor 13 has a first set of shorted conductive turns 201 which are generally symmetrical to the axis 19 when the shaft 17 is aligned therewith. Shorted turns help to increase the induction torque around their axis of symmetry. Turns 201 are held in fixed relation to each other on the magnetically permeable body 126 of rotor 13 and are arranged like longitude lines on a globe, terminating on conductive rings 203 and 205 at top and bottom. Similarly, rotor 13 also has a second set of shorted conductive turns 211 which are generally symmetrical to the axis 23 when aligned therewith. Turns 211 are also held in fixed relation to each other on the magnetically permeable body 126 of rotor 13 and are electrically independent of turns 201. Turns 211 are also arranged like longitude lines on a globe, only with respect to axis 23, terminating on a pair of conductive rings 213 and 215 at left and right in FIG. 7. Coating 128 is suitably molded over the magnetically permeable body 126 and the sets of shorted turns 201 and 211 to provide an approximately spherical surface for rotor 13.

Rotor 13 thus constitutes an approximately spherical rotor including a second magnetically permeable body and first and second sets of shorted conductive turns which are generally symmetrical to first and second axes respectively and are held on the second magnetically permeable body, the rotor being rotatable relative to the base member around the first and second axes.

Stator 15 as above-described constitutes a stator adjacent to the base member, surrounding the rotor and including separated magnetically permeable blocks having an inner winding arrangement which is electrically energizable to rotate the rotor around the first axis, the stator further including additional coils respectively exterior to and associated with the stator blocks and means exterior to the stator blocks for completing magnetic circuits through the additional coils to the rotor and through the first coil (e.g. coil 139), the first coil and the additional coils being energizable to rotate the rotor around the second axis and a third axis.

Dividers or barriers 41, 43, 45, and 47 are made of low permeability material such as plastic or wood. Alternatively a sheet of very high conductivity metal such as copper with insulation backing is sandwiched between the stator blocks to act as a magnetic flux barrier. When inner winding arrangement 121 is used, corner plates 101, 103, 105, and 107 can be of low permeability material such as aluminum, plastic, or wood or can be simply omitted. When the inner winding arrangement is omitted in some embodiments, the corner plates are preferably provided with high permeability material such as iron or steel to complete a low reluctance path between the shanks 91, 93, 95 and 97.

Figure 8:
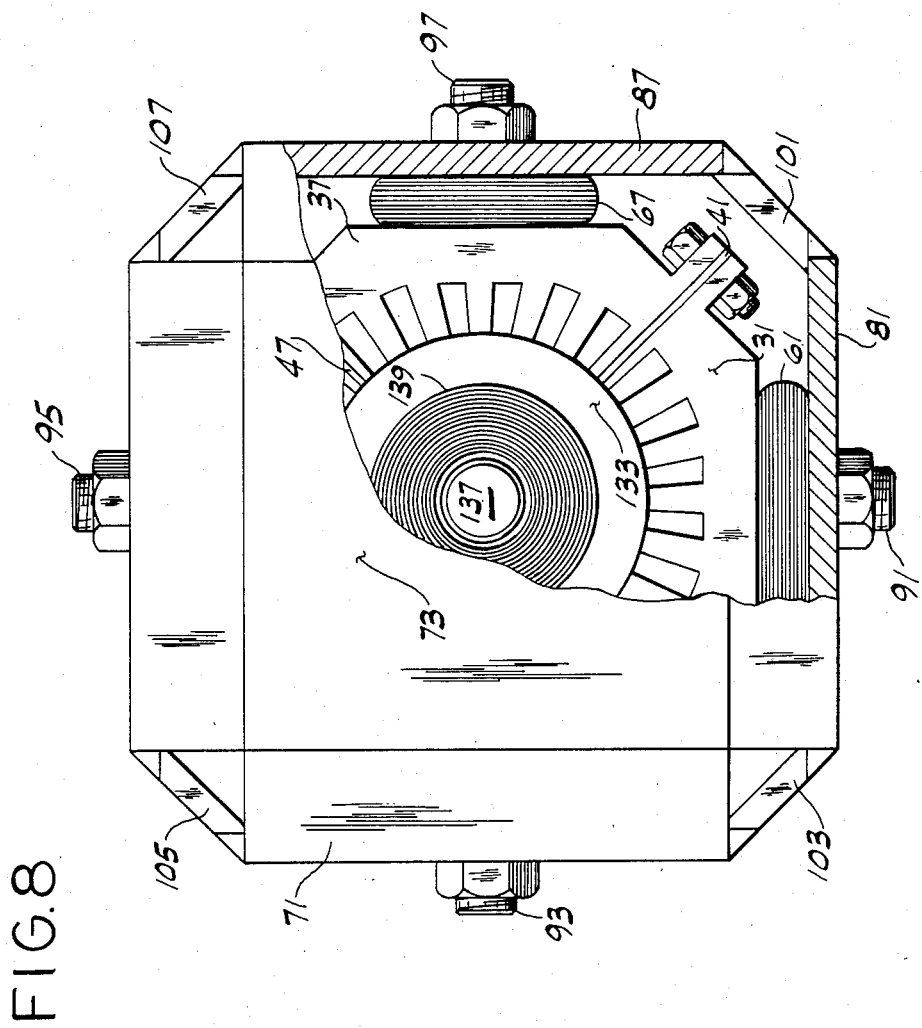
FIG. 8 is a bottom view, partially cut away, of the electrical machine of FIG. 1.

In FIG. 8 pedestal 133 is circular and covers only part of the stator blocks as seen when part of bottom cover 71 is cut away. Thus, there is clearance for the end turns of the inner stator winding arrangement 121 (not shown) between and beneath the slots of the stator blocks. Coil 139 surrounds shank 137. In this cutaway view, coils 61 and 67 are seen to be exterior to stator blocks 31 and 37, with bottom cover 71 completing the magnetic circuit.

Three-phase power source 123 of FIG. 2 is implemented, for instance, with power electronics having a three-phase switching bridge and logic and pulse width modulating circuitry of the type shown in U.S. Pat. No. 3,783,359 to S. L. Malkiel issued Jan. 1, 1974, which is incorporated herein by reference. Similar additional power electronics is suitably used in substitution for the circuit of FIG. 6. Such additional power electronics for coils 139, 61, 63, 65 and 67, for example, has a two-phase switching bridge and control circuitry, instead of the transformer 163 and capacitor 173. Switches 181, 183 and 185 are replaced in such additional power electronics by logic circuitry controlling the operations of the two-phase switching bridge. It is to be understood that three-phase and two-phase excitation are merely illustrative and that other polyphase excitation and other types of excitation and winding arrangements and connections can also be implemented within the scope of the invention by the skilled worker.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electrical machine comprising:
    a base member including a first magnetically permeable body with a first winding arrangement;
    a rotor including a second magnetically permeable body, the rotor being rotatable relative to said base member around first and second axes; and
    a stator adjacent to said base member, surrounding said rotor and including a stator core and second and third winding arrangements, the stator core being wound with the second winding arrangement held inward near the rotor, and wound with the third winding arrangement exterior to said stator core, said second winding arrangement being energizable to rotate said rotor around the first axis and said first and third winding arrangements being jointly energizable to rotate said rotor around the second axis.

2. An electrical machine as set forth in claim 1 wherein the stator core includes separated stator blocks one of which is associated with the third winding arrangement, and the stator further includes a fourth winding arrangement exterior to one of the stator blocks that is adjacent to the stator block associated with the third winding arrangement, said first and fourth winding arrangements being jointly energizable to rotate said rotor around a third axis.

3. An electrical machine as set forth in claim 2 further comprising means for selectively energizing said first, third and fourth winding arrangements with respective currents of which at least one is displaced in phase from the other currents.

4. An electrical machine as set forth in claim 1 wherein the stator core includes separated opposing stator blocks one of which is associated with the third winding arrangement, and the stator includes a fourth winding arrangement exterior to a one of the stator blocks that is opposite to the stator block associated with the third winding arrangement, the first, third and fourth winding arrangements being jointly energizable to rotate the rotor around the second axis.

5. An electrical machine as set forth in claim 4 further comprising means for energizing said first, third and fourth winding arrangements with respective currents of which at least the current in the first winding arrangement is displaced in phase from the other currents.

6. An electrical machine as set forth in claim 1 wherein the stator core includes separated stator blocks one of which is associated with the third winding arrangement, and the the stator includes additional winding arrangements each held exterior to respective ones of the rest of the stator blocks, the first, third and additional winding arrangements being energizable to rotate the rotor around the second axis and a third axis.

7. An electrical machine as set forth in claim 1 wherein said rotor further includes a first set of shorted conductive turns which are generally symmetrical with respect to the first axis; the second magnetically permeable body holding said first set of shorted turns in a fixed relation to each other.

8. An electrical machine as set forth in claim 7 wherein said rotor further includes a second set of shorted conductive turns which are generally symmetrical with respect to the second axis.

9. An electrical machine as set forth in claim 1 wherein said first magnetically permeable body is interposed between said first winding arrangement and said rotor.

10. An electrical machine as set forth in claim 1 wherein said stator further includes means exterior to said stator blocks for completing a magnetic circuit through said rotor and said first and third winding arrangements.

11. An electrical machine as set forth in claim 1 wherein the rotor has an approximately spherical surface portion and the base member has friction-reducing material overlying the first magnetically permeable body and accommodating the spherical surface portion of the rotor.

12. An electrical machine as set forth in claim 1 wherein the stator core includes separated stator blocks.

13. An electrical machine as set forth in claim 1 further comprising a barrier separating said first magnetically permeable body of said base member from said stator core.

14. An electrical machine as set forth in claim 1 wherein said first and third winding arrangements are each a single coil.

15. An electrical machine as set forth in claim 1 further comprising means for energizing said first and third winding arrangements with respective currents displaced in phase from each other.

16. An electrical machine comprising:
a base member including a first magnetically permeable body with a first coil;
an approximately spherical rotor including a second magnetically permeable body, the rotor being rotatable relative to said base member around first and second axes, the first magnetically permeable body of said base member being interposed between the first coil and said rotor, the base member further having friction-reducing material overlying the first magnetically permeable body and accommodating the spherical rotor; and
a stator adjacent to said base member, surrounding said rotor and including separated magnetically permeable blocks having an inner winding arrangement which is electrically energizable to rotate the rotor around the first axis, the stator further including a second coil exterior to at least one of the blocks and means exterior to said stator blocks for completing a magnetic circuit through said rotor and said first and second coils, said first and second coils being jointly energizable to rotate said rotor around the second axis.

17. An electrical machine as set forth in claim 16 wherein the stator further includes a third coil exterior to another one of the stator blocks adjacent to the stator block having the second coil, the first and third coils being energizable to rotate said rotor around a third axis, the electrical machine further comprising means for selectively energizing said first, second and third coils with respective currents at least one of which is displaced in phase from the other currents.

18. An electrical machine as set forth in claim 16 wherein the stator further includes a third coil exterior to another one of the stator blocks opposite the stator block having the second coil, the electrical machine further comprising means for selectively energizing said first, second and third coils with respective currents of which at least the current in said first coil is displaced in phase from the other currents.

19. An electrical machine as set forth in claim 16 wherein the stator includes additional coils each exterior to respective ones of the rest of the stator blocks so that the first coil, the second coil and the additional coils are energizable to rotate said rotor around the second axis and a third axis.

20. An electrical machine as set forth in claim 16 further comprising a barrier separating said first magnetically permeable body of said base member from said stator blocks and barriers separating said stator blocks from each other.

21. An electrical machine as set forth in claim 16 wherein said rotor further includes a first set of shorted conductive turns which are generally symmetrical to the first axis and are held on the second magnetically permeable body.

22. An electrical machine as set forth in claim 21 wherein said rotor further includes a second set of shorted conductive turns which are generally symmetrical to the second axis.

23. An electrical machine comprising:
a base member including a first magnetically permeable body with a first winding arrangement;
a rotor including a second magnetically permeable body; and
a stator adjacent to said base member, surrounding said rotor and including separated magnetically permeable blocks positioned around an axis through said base member, said stator further including second and third winding arrangements exterior to and respectively associated with at least two of the blocks so that the blocks lie between the rotor and the second and third winding arrangements with which they are associated, and means exterior to said stator blocks for completing magnetic circuits through said first winding arrangement to said rotor and through said second and third winding arrangements, said first and second winding arrangements being jointly energizable to rotate said rotor around a second axis perpendicular to the first-named axis and said first and third winding arrangements being jointly energizable to rotate said rotor around a third axis perpendicular to both the first-named axis and the second axis.

24. An electrical machine as set forth in claim 23 further comprising means for selectively energizing said first, second and third winding arrangements with respective currents of which at least one is displaced in phase from the other currents.

25. An electrical machine as set forth in claim 23 wherein the first magnetically permeable body is interposed between the first winding arrangement and said rotor, the rotor has an approximately spherical surface portion and the base member has friction-reducing material overlying the first magnetically permeable body and accommodating the spherical surface portion of the rotor.

26. An electrical machine as set forth in claim 23 wherein said second and third winding arrangements are jointly energizable to rotate said rotor around the first-named axis.

27. An electrical machine comprising:
a base member including a first magnetically permeable body with a first coil;
an approximately spherical rotor including a second magnetically permeable body and first and second sets of shorted conductive turns which are generally symmetrical to first and second axes respectively and are held on the second magnetically permeable body, the rotor being rotatable relative to said base member around the first and second axes, the first magnetically permeable body of said base member being interposed between the first coil and said rotor, the base member further having friction-reducing material overlying the first magnetically permeable body and accommodating the rotor; and a stator adjacent to said base member, surrounding said rotor and including separated magnetically permeable blocks having an inner winding arrangement which is electrically energizable to rotate the rotor around the first axis, the stator further including additional coils respectively exterior to and associated with the stator blocks and means exterior to said stator blocks for completing magnetic circuits to said rotor and through said first coil through said additional coils, the first coil and the additional coils being energizable to rotate said rotor around the second axis and a third axis.

28. An electrical machine as set forth in claim 27 further comprising means for selectively energizing said first coil and said additional coils with respective currents of which at least the current in said first coil is displaced in phase from the other currents.

* * * * *